Stierle & Baer,
Globe Valve,
Nº 58,503. Patented Oct. 2, 1866.
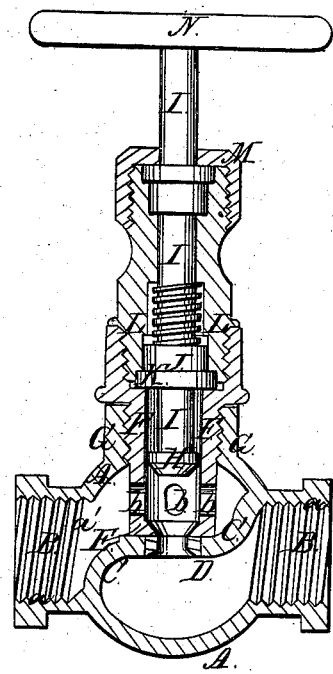
Witnesses.
F. H. Jackson
Wm. Trewin
Inventor.
C. Stierle
Per Munn & Co
Attorneys

UNITED STATES PATENT OFFICE.

C. STIERLE AND JOHN C. BAER, OF CINCINNATI, OHIO.

IMPROVEMENT IN STEAM-ENGINE GLOBE-VALVES.

Specification forming part of Letters Patent No. 58,503, dated October 2, 1866.

*To all whom it may concern:*

Be it known that we, C. STIERLE and JOHN C. BAER, of Cincinnati, Hamilton county, and State of Ohio, have invented new and useful Improvements in Globe-Valves; and we do hereby declare that the following is a full, clear, and exact description thereof, which will enable others skilled in the art to make and use the same, reference being had to the accompanying drawings, forming part of this specification.

The present invention relates to certain new and useful improvements in globe - valves, whereby the grinding of the valve-seat can be evenly, accurately, and perfectly accomplished by simply turning the valve-stem, as will be obvious from the following detail description thereof, reference being had to the accompanying plate of drawings, in which the figure is a central longitudinal section of the valve with its stem in side elevation.

A in the drawings represents the coupling portion of the valve, having each end B provided with a female screw-thread, *a*, for receiving the ends of the pipe which it is to connect together, the central portion of the said coupling being divided by a cross-partition, *c*, into two parts or chambers, in the center of which partition is an aperture, D; E, the valve-seat, formed at the lower end of the hollow casing F, that screws into the center opening, G, of the valve-coupling A, and comes to a bearing in the aperture of the partition-plate *c*, this valve-seat being provided with apertures *b* in its sides within the interior of the coupling A, and an aperture, *c*, in its lower end, by means of which series of apertures a communication is formed through the valve-seat between the two ends of the valve-coupling A; H, the valve on the lower end of the stem I, on which is screwed a nut, J, which, by its notched flange K, is interlocked with the correspondingly-shaped projections upon the lower end of a hollow plug or hub, L, screwed into the upper end of the valve-seat casing F. The stem I extends up through the center of the hub L and through the stuffing-box M, screwed upon its upper end, above which it projects, and has the ordinary-shaped handle N secured to it for convenience in turning it.

By interlocking the screw-nut J with the hub L, as above explained, it is obvious that as the valve-stem is screwed in or out, to close or open the valve, the nut cannot turn with it, but must remain stationary, and that, furthermore, by first screwing up the hub until free of the notches in the nut upon the valve-stem, and then turning the valve-stem around in a forward and backward direction, the valve-seat can be thus perfectly, evenly, and accurately ground, as is obvious without any further explanation, the advantages of which are manifest.

We claim as new and desire to secure by Letters Patent—

1. The independent valve-seat E for the valve H, substantially as described.

2. The combination of the valve-stem I, independent screw-nut J, and hub or plug L, connected together substantially as and for the purpose specified.

CHARLES STIERLE.
JOHN C. BAER.

Witnesses:
WM. RENAU,
LOUIS COHN.